US008218657B2

(12) United States Patent
Spilo

(10) Patent No.: US 8,218,657 B2
(45) Date of Patent: Jul. 10, 2012

(54) SYSTEM AND METHOD FOR AUTOMATIC ADJUSTMENT OF STREAMING VIDEO BIT RATE

(75) Inventor: Michael Spilo, Greenwich, CT (US)

(73) Assignee: Netgear, Inc., San Jose, CA (US)

(*) Notice: Subject to any disclaimer, the term of this patent is extended or adjusted under 35 U.S.C. 154(b) by 955 days.

(21) Appl. No.: 11/234,674

(22) Filed: Sep. 22, 2005

(65) Prior Publication Data
US 2007/0053446 A1    Mar. 8, 2007

Related U.S. Application Data

(60) Provisional application No. 60/714,118, filed on Sep. 2, 2005.

(51) Int. Cl.
*H04L 27/00* (2006.01)

(52) U.S. Cl. .......... 375/259; 375/242; 375/240.03; 375/295

(58) Field of Classification Search .......... 375/259, 375/295, 240.03, 240.12; 178/66.1; 327/1, 327/100; 710/52, 17, 34; 370/232, 235
See application file for complete search history.

(56) References Cited

U.S. PATENT DOCUMENTS

| | | | | |
|---|---|---|---|---|
| 5,159,447 A | * | 10/1992 | Haskell et al. | 375/240.05 |
| 5,365,552 A | * | 11/1994 | Astle | 375/354 |
| 5,412,428 A | * | 5/1995 | Tahara | 375/240.25 |
| 5,559,798 A | * | 9/1996 | Clarkson et al. | 370/468 |
| 5,566,208 A | * | 10/1996 | Balakrishnan | 375/240 |
| 5,734,432 A | * | 3/1998 | Netravali et al. | 375/240.05 |
| 5,852,630 A | * | 12/1998 | Langberg et al. | 375/219 |
| 6,044,396 A | * | 3/2000 | Adams | 725/95 |
| 6,460,097 B1 | * | 10/2002 | Harumoto et al. | 710/60 |
| 6,792,618 B1 | * | 9/2004 | Bendinelli et al. | 725/112 |
| 6,999,447 B2 | * | 2/2006 | D'Amico et al. | 370/349 |
| 7,016,409 B2 | * | 3/2006 | Unger | 375/240.02 |
| 7,369,497 B2 | * | 5/2008 | Naruse | 370/235 |

(Continued)

FOREIGN PATENT DOCUMENTS

EP    H03M7/00    8/1998

(Continued)

OTHER PUBLICATIONS

Supplemental European Search Report, Dec. 7, 2009.

(Continued)

*Primary Examiner* — Shuwang Liu
*Assistant Examiner* — Helene Tayong
(74) *Attorney, Agent, or Firm* — PatentEsque Law Group, LLP

(57) ABSTRACT

A system and method for automatically sets the encoding bit-rate across a network. The method includes encoding an original media stream with an encoding bit rate having an adjustable rate, transmitting the encoded media stream to a receiver, monitoring a throughput of the encoded media stream, computing an adjustment to the encoding bit rate, and adjusting the encoder's encoding bit rate. A throughput monitor (which can be freestanding, part of the transmitter, or part of the receiver), is operable to monitor the encoded media stream, wherein the transmitter is operable to adjust the encoding bit rate using a result of the monitored throughput. The transmitter and receiver both contain a buffer, and respective buffer monitors. Conditions (e.g., overflow, full, empty) at the transmitter or receiver buffer are detected by the respective transmitter or receiver buffer monitor, where upon a repeated condition the encoded bit rate is adjusted higher or lower.

25 Claims, 3 Drawing Sheets

U.S. PATENT DOCUMENTS

| | | | |
|---|---|---|---|
| 7,581,019 B1* | 8/2009 | Amir et al. | 709/235 |
| 7,743,183 B2* | 6/2010 | Virdi et al. | 710/52 |
| 2005/0053084 A1* | 3/2005 | Abrol et al. | 370/412 |
| 2005/0172028 A1 | 8/2005 | Nilsson et al. | |
| 2006/0083263 A1* | 4/2006 | Jagadeesan et al. | 370/487 |
| 2006/0233237 A1* | 10/2006 | Lu et al. | 375/240.03 |
| 2006/0282566 A1* | 12/2006 | Virdi et al. | 710/52 |
| 2008/0186849 A1* | 8/2008 | Kampmann et al. | 370/232 |
| 2009/0052323 A1* | 2/2009 | Breynaert et al. | 370/235 |
| 2009/0285282 A1* | 11/2009 | Amir et al. | 375/240.02 |

FOREIGN PATENT DOCUMENTS

| | | |
|---|---|---|
| EP | 1237345 | 4/2002 |
| WO | WO2004/040831 | 3/2004 |

OTHER PUBLICATIONS

Summons to attend oral proceedings pursuant to Rule 115(1) EPC, Jul. 21, 2011.

Decision of the Examining Division dated Feb. 22, 2012; Decision to refuse a European Patent application dated Feb. 28, 2012.

\* cited by examiner

SYSTEM AND METHOD FOR AUTOMATIC ADJUSTMENT OF STREAMING VIDEO BIT RATE

CLAIM OF PRIORITY

This application claims the benefit of priority, under 35 U.S.C. §119(e), of U.S. Provisional Application No. 60/714,118, filed Sep. 2, 2005, and titled "System and Method for Automatic Adjustment of Streaming Video Bit Rate," which is hereby incorporated by reference in its entirety.

FIELD OF INVENTION

The present invention relates to adjusting the encoding bit-rate for transfer of video digital content across a network, and in particular to automatically setting the optimum bit-rate across a network when a varying throughput is presented.

BACKGROUND OF THE INVENTION

When streaming across a network, the quality of the received video is dependent on a continuous flow of data from the source to the destination. Several approaches have been used to resolve this issue. Cirrus Logic proposed a solution under the commercial name Whitecap, and others have proposed similar hardware solutions for a guaranteed bit-rate. These solutions typically provide prioritization and quality of service layers on top of the standard hardware for the network.

Real Audio and others ask the users whether they have a "high bandwidth" connection and then employ very large buffers to control the streaming to overcome the unreliable nature of network streaming.

An approach is needed that does not require user interaction, or specialized hardware, and can provide an acceptable video and audio stream even in low bandwidth situations such as when using a wireless network or across the internet.

SUMMARY OF THE INVENTION

The present invention relates to a system for automatically setting the optimum encoding bit-rate for transfer across a network.

In one aspect of the invention, a method for transmitting a media stream over a network includes the steps of encoding, with an encoder portion of a transmitter, an original media stream with an encoding bit rate that has an adjustable rate, transmitting the encoded media stream to a receiver connected to the network, monitoring a throughput of the encoded media stream, computing an adjustment to the encoding bit rate using a result of the monitoring step, and adjusting the encoder's encoding bit rate so as to encode the encoded media stream at an adjusted bit rate.

In another aspect of the invention a device for implementing this method includes a transmitter and a receiver in communication over the network. The transmitter contains a central processing unit, a network interface, and an encoder, the encoder being operable to encode an original media stream, with an encoding bit rate, into an encoded media stream. The receiver contains a central processing unit, a network interface, and a decoder, the receiver being operable to receive the encoded media stream from the transmitter. A throughput monitor associated with the network, which can be freestanding, part of the transmitter, or part of the receiver, is operable to monitor the encoded media stream, wherein the transmitter is operable to adjust the encoding bit rate using a result of the monitored throughput.

In another aspect of the invention, the transmitter and receiver both contain a buffer, and respective buffer monitors. Conditions (e.g., overflow, full, empty) at the transmitter or receiver buffer are detected by the respective transmitter or receiver buffer monitor, where upon a repeated condition the encoded bit rate is adjusted higher or lower, depending on whether the condition exists at the receiver or the transmitter and on what is the status of the detected condition.

These and other aspects, features, steps and advantages can be further appreciated from the accompanying drawing Figures and description of certain illustrative embodiments.

BRIEF DESCRIPTION OF THE DRAWING FIGURES

DEFINITION OF TERMS

The terms used in this specification generally have their ordinary meanings in the art, within the context of the invention, and in the specific context where each term is used. Certain terms are discussed below, or elsewhere in the specification, to provide additional guidance to the practitioner in describing the devices and methods of the invention and how to make and use them. It will be appreciated that the same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the invention or of any exemplified term. Likewise, the invention is not limited to the preferred embodiments.

"Audio," "video," "audiovisual data," "audiovisual media," "media content," mean any information in any analog or digital format which can be displayed, rendered or perceived in sight and/or sound, with or without any other accompanying information that is "hidden," i.e., not displayed, rendered or perceived. For example, "audiovisual data" includes both digital and/or analog media. Likewise, "content" also refers to the audiovisual data, with or without additional "hidden" information.

"Streaming Video", "data stream", and "data" mean any information any analog or digital format that has been processed in any manner (such as being encoded), contain audiovisual data content, and are capable of being transmitted over a network.

"Instantaneous bit rate" is defined as the bit rate computed over a fixed number of data samples or for a small fixed period of time. These rates can be calculated or read from the data directly.

"Throughput" and "throughput of the transmission" refer to the amount of data that has been transmitted over a network in a given period of time.

Detailed Description Of Illustrative Embodiments

By way of overview and introduction, presented and described are embodiments of a system for automatically measuring the bandwidth across a network by monitoring the audio video stream. The system automatically adjusts the picture and/or video bit rate and compression in order to accommodate available bandwidth with the best possible picture.

Figure 1:
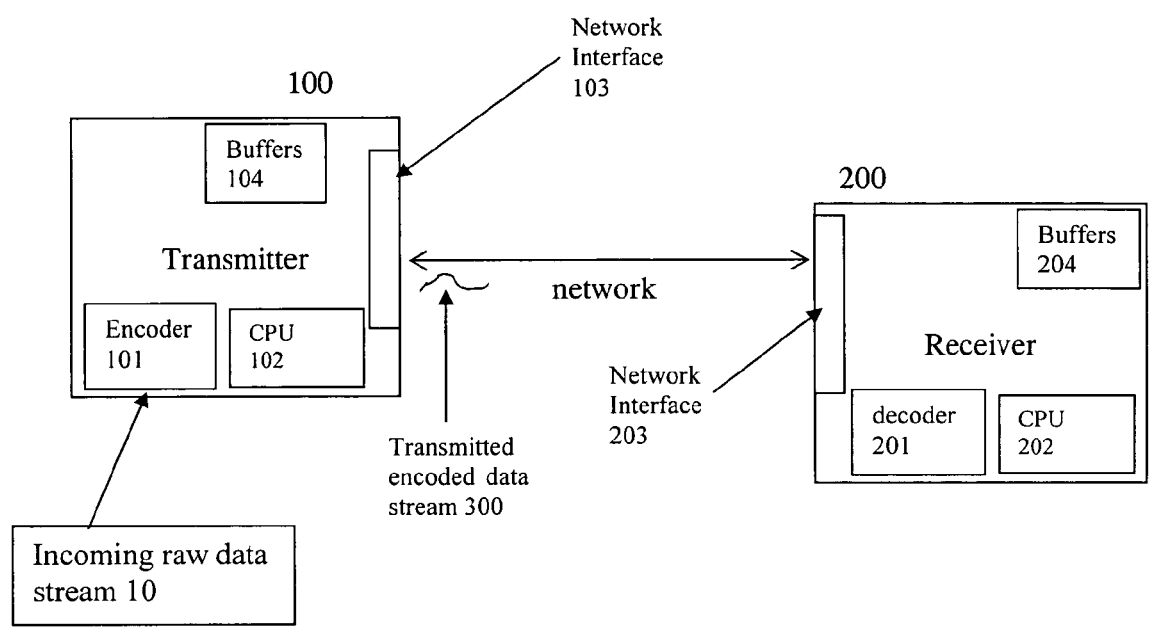
FIG. 1 shows a schematic diagram of a system for an embodiment of the invention.

With reference to FIG. 1, illustrated is a schematic diagram of an embodiment of the invention. The embodiment includes a transmitter 100 and receiver 200 capable of transmitting audiovisual data over a network. The transmitter includes an encoder 101, a central processing unit 102, and a network interface 103. The receiver includes a decoder 201, a central processing unit 202, and a network interface 203.

The transmitter establishes a session with the receiver (or vice versa) by sending a transmission request. An initial bit rate is established, either at a fixed rate, a manually set rate (as in Real Audio), a highest possible rate, or an instantaneous rate as measured by the system. In order to obtain an instantaneous rate, the system can send a small amount of data across the session to measure a starting rate. Once the session is initiated, the audiovisual data is transmitted by the transmitter 100 at the initial rate. The transmission stream is monitored by a throughput monitor, which is associated with the network, and can be located at the receiver, the transmitter, or at both the receiver and the transmitter.

Figure 2:
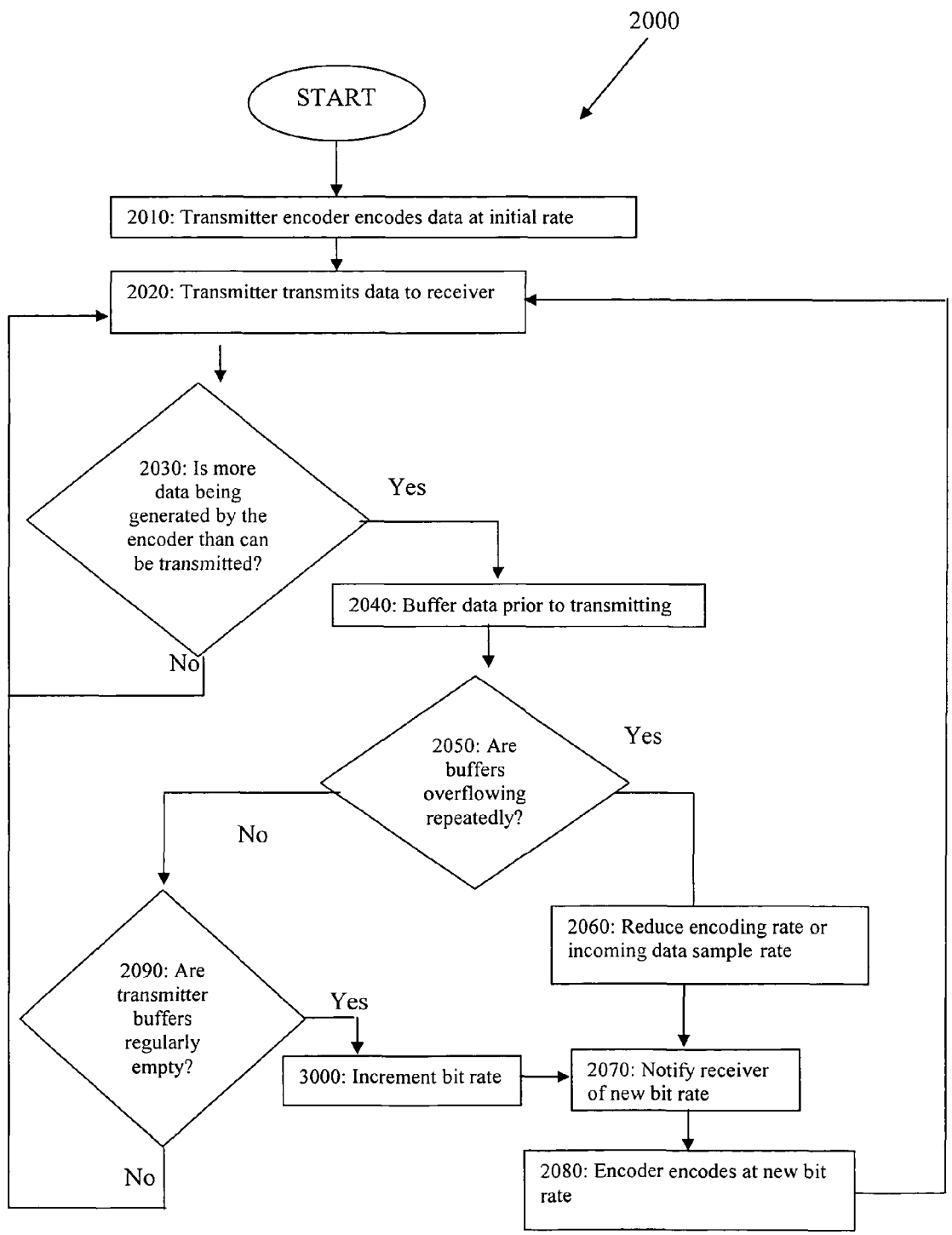
FIG. 2 illustrates a flow chart for determining the bit rate adjustment as monitored by the transmitting system.

FIG. 2 depicts a process 2000 for monitoring the transmission by the transmitter. As shown in step 2010, the encoder 101 encodes the data at the initial rate. The data generated by the transmitter encoder 101 can be an audiovisual, audio, or a video-only stream encoded at a certain bit rate. As the encoder 101 encodes more data, the already-encoded data stream is transmitted to the receiver 200, as shown in step 2020. If the encoder 101 is generating more data than can be transmitted (step 2030), then the data is placed into buffer system 104 (step 2040). If the buffers 104 repeatedly overflow such that there are no available buffers for newly encoded data (step 2050), then the transmitter CPU 102 determines that the encoder bit rate is too high. The CPU 102 reduces the encoding bit rate and/or reduces the sample of the incoming video stream 50 to prevent the buffer overflows (step 2060).

The reduced encoding bit rate can represent a predefined reduction from the prior encoding rate, e.g. 75% of the prior encoding bit rate. Alternatively, the transmitter CPU 102 can automatically adjust to an encoding bit rate that is instantaneously calculated from the rate at which the filled buffers 104 are transmitted and cleared.

If necessary, the transmitter 100 then notifies the receiver 200 that the bit rate has changed (step 2070 need to reflect that this is an optional step in the figure), and the transmission continues at the new lower bit rate (step 2080). Such a notification can be needed in the event that the receiver's decoding capability requires a re-start or re-programming in order to handle a new bit rate.

If the buffers 104 are regularly empty (step 2090) such that the data stream 300 is being transmitted as fast, or faster than the rate at which the encoder 101 generates encoded data, the transmitter 100 can automatically attempt to adjust by detecting whether the bit rate can be safely raised, and compute a new increased bit rate. The increased bit rate can be defined by a small fixed increment in the current bit rate; by a factor multiplied by the current bit rate; or by computing a "best-fit" bit rate based on the instantaneous rate computation (step 3000). Preferably, changing the encoding bit rate requires the encoder to be restarted using a different set of encoding parameters. The decoder also may need to be restarted to adjust for the new parameters. Both cases may result in a discontinuity being perceived during playback.

To prevent a discontinuity in the event that bandwidth is insufficient to accommodate an increased bit rate, the transmitter tests whether available spare bandwidth exists prior to adjusting the actual encoding bit rate. To test for spare bandwidth existence, the transmitter 100 inserts padding blocks, which are discarded by the receiver 200, into the transmission data corresponding with the newly computed increased bit rate. If the buffers 104 remain regularly empty for a given period while the padding blocks are being sent, then the transmitter 100 permanently increases the encoding bit rate to the computed value. If however the buffers 104 begin to fill while the padding blocks are being sent, the transmitter 100 aborts the attempt to increase the bit rate. Alternatively, the transmitter 100 can elect to increase the encoding bit rate in this manner following a bit rate reduction from the initial instantaneous bit rate after some period has elapsed, so as to recover from temporary reductions in the network bandwidth. The transmitter can also elect not to try to increase the bit rate if there was no reduction from the initial instantaneous bit rate, or after a previous failed attempt within a given period.

Alternatively, the transmitter 100 can monitor the mean bit rate of the data stream being transmitted. If the measured instantaneous bit rate reflects a significant drop (determined by either a manual setting or a predetermined constant, e.g., 50%) from the mean bit rate, then the transmitter 100 automatically attempts to raise the bit rate to the original mean bit rate. The transmitter 100 can also perform this comparison on a periodic basis.

Figure 3:
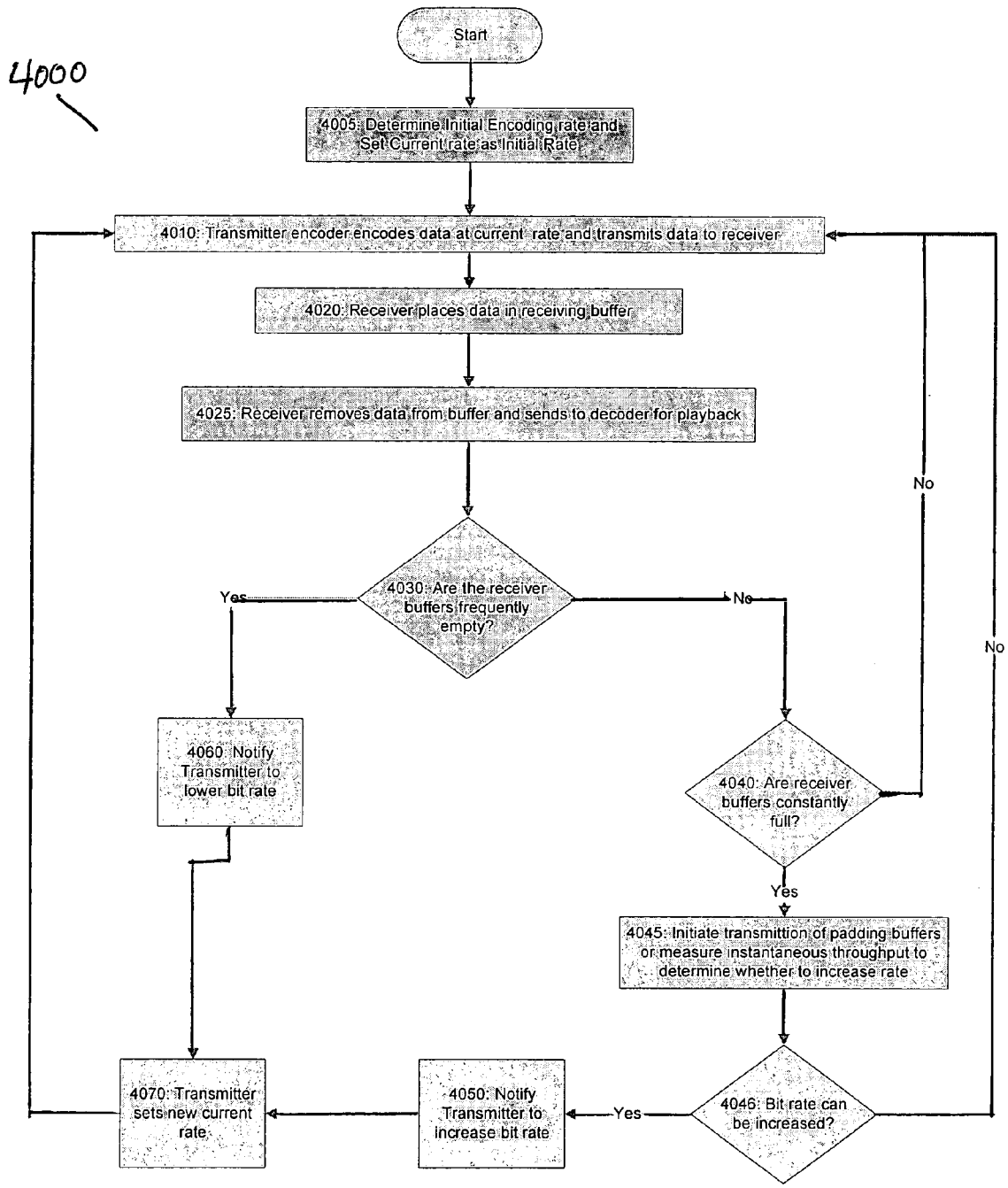
FIG. 3 illustrates a flow chart for determining the bit rate adjustment as monitored by the receiving system.

FIG. 3 depicts process 4000 where the receiver 200 monitors the transmitter 100. The receiver can perform the process 4000 separately or simultaneously with the transmitter 100. The throughput monitor determines, step 4005, the initial encoding rate (as described above) and passes the initial coding rate to the transmitter 100 as the current rate. The transmitter encoder 101 encodes the date at the current rate and transmits the data to the receiver 200, step 4010. The received data is placed into a receiving buffer 204, step 4020, if a buffer is present. Under control of the receiver CPU 202, data is removed from the receiver buffer and sent to the receiver decoder 201 for decoding and subsequent playback. If the receiver CPU 202 detects that the receiver buffers 204 are constantly empty step 4030, and all received data has been decoded by the decoder 201, then the receiver 200 determines that the transmitter 100 is not transmitting the encoded data fast enough. If the network bandwidth is sufficient for the bit rate, then the receiver buffers' content is consumed at the same rate as they are filled, since the encoding and decoding rates are the same. By allowing the receiver buffers to fill prior to starting the decoding process, the receiver detects potential insufficient bandwidth any time a buffer is needed for playback and all buffers are empty. A consecutive series of such detections results in a positive determination of insufficient bandwidth.

Upon a positive determination of insufficient bandwidth, the receiver 200 sends a request to the transmitter 100 to lower the encoding bit rate so that more encoded data can be transmitted, step 4060. However, if the receiver buffers 204 are constantly full for a given period, then spare network bandwidth may exist and the receiver 200 can elect to try to increase the encoding rate. To determine whether the encoding bit rate can be increased, the receiver 200 sends a request to the transmitter 100 to simulate higher bit rate transmission by inserting padding blocks into the bit stream, which are thrown away by the receiver 200 upon reception. If the receiver buffers 204 remain constantly full, step 4040 a transmission of padding buffers are sent to measure instantaneous bandwidth, step 4045 If the receiver buffers remain full for a given period of time while the padding blocks are being sent, step 4046, the receiver 200 sends a request to the transmitter 100 to increase the encoding rate for faster data stream transmission, step 4050. At step 4070 the transmitter sets the new current rate, and process 4000 returns to step 4010.

If however the receiver buffers begin to drain while the padding blocks of step 4045 are being sent, then the attempt is aborted and process 4000 returns to step 4010. Alternatively, the receiver 200 can elect to increase the encoding bit rate in this manner after a bit rate reduction from the initial instantaneous bit rate after some period of time has elapsed, so as to recover from temporary reductions in the network bandwidth. The receiver can elect not to try to increase the bit rate if there was no reduction from the initial instantaneous bit rate, or after a previous failed attempt within a given period.

In another embodiment (not depicted), the receiver 200 monitors and compares the bit rate of the data stream received against the actual data transmission bit rate (equivalent to the encoding bit rate). The receiver 200 determines the received data bit rate by measuring the time required to receive a small fixed number of data samples, or by measuring the number of data samples that arrive within a small fixed time frame. The actual data transmission bit rate can be obtained from the transmitter 100 independently, or computed from time stamps placed by the transmitter 100 in each transmitted encoded data sample 300 using the same computational method described previously for determining the received data bit rate. If the received data bit rate is lower than the actual transmission data bit rate, the receiver 200 sends a request to the transmitter 100 requesting that the encoding data bit rate be lowered. If the received data bit rate is equal to the actual data transmission bit rate, the receiver 200 can request that the transmitter increase the transmission bit rate by including padding blocks in the transmission, as described above.

The encoding data bit rate can be adjusted in a variety of ways. These adjustments can including changing the video and/or audio encoding bit rates, sampling size, sampling resolution or frame size, and/or other encoder characteristics, as are available on a common encoder 101.

In another embodiment of the invention, the transmitter transmits an encoded data stream over a network to more than one receiver. The transmitter uses a common set of buffers from which to transmit the data stream, the data stream being encoded with an initial bit rate by the encoder. The initial bit rate can be selected in several ways, such as based on an estimate of the properties of the data stream or the properties of the transmitter, the previous throughput or bit rates used by the transmitter, or based on data requested or gathered from the receivers receiving the data stream. Preferably, the initial bit rate is selected from the lowest common bit rate in a set composed of each receiver's acceptable bit rate. In the event the lowest common bit rate is not acceptable to one or more receivers, then a new lowest common bit rate is taken as the lowest bit rate acceptable to the largest number of receivers. If any receivers do not accept this new lowest common bit rate, any such receivers are dropped from the set.

A throughput monitor associated with the network can monitor the throughput at which the transmitter transmits data to all the receivers. Additionally, the throughput monitor can monitor the throughput at each receiver. Each receiver can request that the transmitter decrease the encoder bit rate if the throughput at the receiver is insufficient to render the data stream. Each receiver can request that the transmitter increase the transmission bit rate by including padding blocks in the transmission.

Thus, while there have been shown, described, and pointed out fundamental novel features of the invention as applied to several embodiments, it will be understood that various omissions, substitutions, and changes in the form and details of the devices illustrated, and in their operation, may be made by those skilled in the art without departing from the spirit and scope of the invention. Substitutions of elements from one embodiment to another are also fully intended and contemplated. It is also to be understood that the drawings are not necessarily drawn to scale, but that they are merely conceptual in nature. The invention is defined solely with regard to the claims appended hereto, and equivalents of the recitations therein.

I claim:

1. A method for transmitting a media stream over a network comprising the steps of:
    providing a transmitter and a receiver connected through the network, wherein the transmitter includes an encoder having an adjustable bit rate and a transmission buffer having a fixed size;
    encoding, by the encoder, with an encoding bit rate an original media stream into an encoded media stream;
    transmitting the encoded media stream to the receiver;
    monitoring a throughput of the encoded media stream;
    wherein the monitoring step provides a result based on at least a rate at which the transmission buffer is filled and cleared;
    computing an adjustment to the encoding bit rate using the result of the monitoring step without changing the size of the transmission buffer; and
    adjusting the encoding bit rate so as to encode the encoded media stream at an adjusted bit rate; wherein the adjusting is executed after receiving, from the receiver, a request for a change in the encoding bit rate; and wherein the encoding bit rate is reduced if the transmitter buffer repeatedly overflows and the encoding bit rate is increased if the transmitter buffer is repeatedly empty.

2. The method of claim 1, wherein the step of adjusting is executed as a result of an internal computation by the transmitter.

3. The method of claim 1, further including, after the adjusting step, the step of notifying the receiver that an adjustment to the encoding bit rate has been made.

4. The method of claim 1, wherein the providing step further includes providing a plurality of receivers connected to the transmitter through the network, and the transmitting step further includes transmitting the encoded media stream to the plurality of receivers.

5. The method of claim 4, wherein the monitoring step includes monitoring the throughput of the encoded media stream at each of the plurality of receivers.

6. The method of claim 4, wherein the step of adjusting is executed after receiving, from one of the plurality of receivers, a request for a change in the encoding bit rate.

7. The method of claim 4, wherein the encoding step's encoding bit rate is a minimum acceptable bit rate common to each of the plurality of receivers.

8. A device for transmitting data over a network comprising:
    a transmitter and a receiver in communication over the network;
    the transmitter containing a central processing unit, a network interface, a buffer having a fixed size, and an encoder, the encoder being operable to encode an original media stream, with an encoding bit rate, into an encoded media stream;

the receiver containing a central processing unit, a network interface, and a decoder, the receiver being operable to receive the encoded media stream from the transmitter;

a throughput monitor operable to monitor the encoded media stream based on at least a rate at which the transmission buffer is filled and cleared;

wherein the transmitter is operable to adjust the encoding bit rate using a result of the monitored throughput without adjusting the size of the buffer; wherein the receiver is operable to send a request to the transmitter to initiate the encoder adjustment; and wherein the transmitter is further operable to adjust the encoding bit rate in response to a predetermined capacity condition detected by the throughput monitor, and if the throughput monitor detects that the transmitter buffer repeatedly overflows, then the encoding bit rate is reduced.

9. The device of claim 8, wherein the throughput monitor is located within the transmitter and monitors the throughput of the encoded media stream at an output of the transmitter network interface.

10. The device of claim 8, wherein the transmitter is further operable to initiate the encoder adjustment in response to an internal computation at the transmitter.

11. The device of claim 8, wherein the transmitter is further operable to notify the receiver of the adjustment to the encoding bit rate.

12. The device of claim 8, further comprising a plurality of receivers in communication with the transmitter over the network.

13. The device of claim 12, wherein the throughput monitor is further operable to monitor the throughput at each of the plurality of receivers.

14. The device of claim 12, wherein each of the plurality of receivers is further operable to send a request to the transmitter to initiate the encoder adjustment.

15. The device of claim 12, wherein the encoding step's encoding bit rate is a minimum acceptable bit rate common to each of the plurality of receivers.

16. A device for transmitting data over a network comprising:

a transmitter and a receiver in communication over the network;

the transmitter containing a central processing unit, a transmitter buffer having a fixed size, a transmitter buffer monitor, a network interface, and an encoder, the encoder being operable to encode an original media stream, with an encoding bit rate, into an encoded media stream;

wherein the transmitter buffer monitor is configured to determine a rate at which the transmission buffer is filled and cleared;

the receiver containing a central processing unit, a receiver buffer, a receiver buffer monitor, a network interface, and a decoder, the receiver being operable to receive the encoded media stream from the transmitter; and wherein the transmitter is operable to adjust the encoding bit rate in response to the transmission buffer fill and clear rate determined by the transmitter buffer monitor without adjusting the size of the transmitter buffer; wherein the receiver is operable to send a request to the transmitter to initiate the encoder adjustment; and wherein the transmitter is further operable to adjust the encoding bit rate in response to a predetermined capacity condition detected by the transmitter buffer monitor, and if the transmitter buffer monitor detects that the transmitter buffer repeatedly overflows, then the encoding bit rate is reduced.

17. The device of claim 16, wherein the transmitter is further operable to adjust the encoding bit rate in response to a predetermined capacity condition detected by the transmitter buffer monitor, and if the transmitter buffer monitor detects that the transmitter buffer is repeatedly empty, then the encoding bit rate is increased.

18. The device of claim 16, wherein if the receiver buffer detects that the receiver buffer is not full for a given period, then the encoding bit rate is increased.

19. The device of claim 16, wherein if the receiver buffer monitor detects that the receiver buffer is repeatedly empty as a result of insufficient bandwidth, then the encoding bit rate is reduced.

20. The device of claim 16, wherein the transmitter is further operable to notify the receiver of an adjustment to the encoding bit rate.

21. A method for transmitting a media stream over a network comprising the steps of:

providing a transmitter and a receiver connected through the network, wherein the transmitter includes a transmitter buffer having a fixed size, a transmitter buffer monitor, and an encoder having an adjustable bit rate, and the receiver includes a receiver buffer;

encoding an original media stream by the encoder having an encoding bit rate; transmitting the encoded media stream to the receiver;

monitoring the transmitter buffer, by the transmitter buffer monitor, for a predetermined capacity condition;

wherein the monitoring step provides a result based on at least a rate at which the transmission buffer is filled and cleared;

computing an adjustment to the encoding bit rate based on the result and when the monitoring step detects the predetermined capacity condition without changing the size of the transmitter buffer; and adjusting the encoding bit rate so as to encode the original media stream at an adjusted bit rate; wherein the adjusting is executed after receiving, from the receiver, a request for a change in the encoding bit rate; and monitoring the transmitter buffer for the predetermined capacity condition and increasing the encoding bit rate, by the transmitter, if the detected predetermined capacity condition includes the transmitter buffer being repeatedly empty.

22. The method of claim 21, further including the steps of monitoring the transmitter buffer for the predetermined capacity condition and decreasing the encoding bit rate, by the transmitter, if the detected predetermined capacity condition includes the transmitter buffer being repeatedly full.

23. The method of claim 21, further including the step of decreasing the encoding bit rate, by the transmitter, if the detected predetermined capacity condition includes the receiver buffer being repeatedly empty.

24. The method of claim 21, further including the step of increasing the encoding bit rate, by the transmitter, if the detected predetermined capacity condition includes the receiver buffer being not repeatedly full.

25. The method of claim 21, further including, after the step of adjusting, the step of notifying the receiver of an adjustment to the encoding bit rate.

* * * * *